(12) United States Patent
Abe

(10) Patent No.: US 6,449,128 B1
(45) Date of Patent: Sep. 10, 2002

(54) DISK DRIVE WITH HEAD LOADING AND UNLOADING MECHANISM

(75) Inventor: Toshiaki Abe, Ome (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/523,678

(22) Filed: Mar. 10, 2000

(30) Foreign Application Priority Data

Jul. 30, 1999 (JP) .......................................... 11-217150

(51) Int. Cl.⁷ ................................................ G11B 5/54
(52) U.S. Cl. ................................. 360/254.8; 360/245.7
(58) Field of Search .......................... 360/255.2, 255.9, 360/245.7, 254.2

(56) References Cited

U.S. PATENT DOCUMENTS 5,526,206 A * 6/1996 Shimizu .................. 360/245.7
6,067,209 A * 5/2000 Aoyagi ....................... 360/104

FOREIGN PATENT DOCUMENTS

JP        6-60578    3/1994    ............ G11B/21/12
JP        11-96707   4/1999    ............ G11B/21/12

* cited by examiner

Primary Examiner—A. J. Heinz
(74) Attorney, Agent, or Firm—Gray Cary Ware & Freidenrich LLP

(57) ABSTRACT

A disk drive is disclosed which has a head loading/unloading mechanism which, at load time, moves a head from a head parking member over a disk (loading) and, at unload time, moves it back to the head parking member (unloading). The head parking member has an unload surface on which an unloading tab slides on as an actuator moves which has the head mounted on it and a parking area which is formed to be continuous with the unload surface and provides a place where the unloading tab comes to rest. Further, the head parking member has a limiting member formed to cover the parking area and a portion of the unload surface continuous with the parking area for restricting the movement of the unloading tab in the vertical direction with respect to the unload surface.

3 Claims, 4 Drawing Sheets

DISK DRIVE WITH HEAD LOADING AND UNLOADING MECHANISM

CROSS-REFERENCE TO RELATED APPLICATION

This application is based upon and claims the benefit of priority from the prior Japanese Patent Application No. 11-217150, filed Jul. 30, 1999, the entire contents of which are incorporated herein by reference.

BACKGROUND OF THE INVENTION

The present invention relates to a disk drive with head loading/unloading mechanism and more specifically to the structure of a head parking member that withdraws heads from disks at unload time.

In recent years, various technologies have been developed to meet high recording density requirements of hard disk drives (HDD). Among these is a head loading/unloading mechanism (also referred to as a head parking member load mechanism) for loading a head toward a disk and unloading (or retracting) it from the disk.

The mechanism is intended to, at the termination of a read/write operation, unload the head from the disk and withdraw it to a member, called a head parking member, which is placed outside the disk. At the start of an read/write operation, the mechanism moves the head from the head parking member over the disk and then loads it toward the disk. Here, the head is a flying head that comprises a slider on which a read head (MR head) and a write head are mounted and floats just over the disk surface for reading from and writing to the disk.

Such a mechanism allows the elimination of contact between the head and the disk surface at unload time because the head is withdrawn to the head parking member. Therefore, disks used are allowed to have a very smooth surface, thus allowing the head-to-disk spacing to be reduced. This leads to an increase in data recording density.

In general, in HDDS that use the head loading/unloading mechanism, the aforementioned ram is mounted in proximity to the circumference of the disk that is driven to spin by a spindle motor. In the HDDs, the heads are mounted on a rotary type of actuator driven by a voice coil motor (VCM). When the actuator is driven, the head moves radially across the surface of the spinning disk while floating above the disk surface. To the actuator is attached a unloading bar-like member called a tab. Specifically, the tab is attached to the end of a suspension which is a component of the actuator. The suspension is a plate spring member on which the heads are mounted.

The unload operation is withdrawing the heads positioned over the disk to the head parking member by moving the actuator toward the outside of the disk when a command is given to stop disk rotation (or when the power is turned off). The unload operation is also called the retract operation. The load operation is moving the heads placed in the unloaded state over the disk by moving the actuator toward the inside of the disk.

In the unload operation, when the actuator approaches the head parking member, the tab slides on the unload surface of the tab and reaches the predetermined stop position (parking area). That is to say, the heads are placed in the withdrawn state when the tab is at rest in the parking area (recessed area).

FIGS. 8A and 8B each show a state, as viewed from the disk side, where tabs 131 are brought into contact with unload surfaces 142 of a head parking member 14. With the structure of the head parking member 14 shown in FIG. 18A, in the event that an external shock is applied to the HDD body after the heads are withdrawn from the disk, the tabs 131 can jump from the unload surfaces 142.

In that event, the suspension may also vibrate and, in the worst case, the heads mounted on the suspension may become damaged. To prevent the tabs at rest on the unload surfaces from jumping, such a head parking member as shown in FIG. 8B has been developed which has height-limiting members 140 called limiters.

An unload operation when the head parking member 14 provided with such limiters is used will be described with reference to FIG. 9.

When the head positioned over the disk has come to the head parking member 14, the tab 131 slides on the unload surface 142 in the direction of an arrow 90 and comes to rest in the parking area (recessed area) 141 on the unload surface. In this case, the design is such that, when the actuator hits a stopper made of rubber to stop, the tab 131 comes to rest in the parking area 141.

To prevent the heads from becoming damaged due to a shock resulting from the actuator hitting the stopper, the rubber stopper is deformed to absorb the shock. For this reason, the tab 131 will move in the direction of an arrow 92 up to the back of the parking area 141 (overshoot position). And now, the resiliency of the stopper will push back the tab in the direction of an arrow 91 (the load direction), namely, in the direction of the disk 11.

As stated above, the use of a head parking member having limiting members allows the up and down movements of the tabs at rest in the parking areas to be suppressed. In the actual unload operations the tab moves on the unload surface on opposite sides of the parking area before it comes to rest in that area.

The parking area 141 is shaped in a recessed form and hence has slant surfaces that are continuous with the unload surface. Therefore, as shown in FIG. 5, the slant surfaces act like a kind of ski jump when the tab passes past the parking area, causing the tab to jump up or down. There is no limiter before and behind the parking area. As a result, such movements of the tab cannot be suppressed and, in the worst case, the heads may become damaged.

BRIEF SUMMARY OF THE INVENTION

It is an object of the present invention to provide a disk drive with head loading/unloading mechanism which permits the unload-time vertical movement of an unloading tab attached to the end of an actuator having a head mounted on it to be restricted and thus prevents the head from becoming damaged by unwanted shock.

The present invention relates to the structure of a head parking member for stabilizing the state of the head at unload time in a disk drive having a head loading/unloading mechanism. Specifically, the inventive head parking member is provided outside a disk and has an unload surface on which the unloading tab slides as the actuator moves at unload time. The unloading tab is attached to the end of a suspension attached to the actuator. The suspension supports the head. The unload surface is formed with a parking area in the form of a recessed area having slant surfaces continuous with the unload surface. The parking area is a place where the unloading tab comes to rest.

Further, the head parking member is provided with a limiting member for restricting the vertical movement of the unloading tab which is moving or at rest in a given portion of the unload surface containing the parking area. Specifically, the limiting member is formed in such a way as to cover that given portion of the unload surface and be intersected by an extension of a slant surface of the parking area and is therefore permitted to restrict the movement of the unloading tab in the vertical direction with respect to the unload surface.

In the disk drive using the head parking member thus constructed, when the disk stops rotating (or the power is turned off), an unload operation is carried out to move the actuator in the direction of the ram. That is, a retract operation of withdrawing the head to the ram is carried out. When the actuator has arrived at the head parking member, the unloading tab slides on the unload surface and reaches the parking area. When the actuator stops moving, the unloading tab comes to rest in the parking area or on a portion of the unload surface before or behind the parking area. When a shock is externally applied to the disk drive while the unloading tab is at rest or moving in the given portion of the unload surface containing the parking area, the tab may jump from the unload surface. when the tab moves past the parking area, the slant surfaces act like a ski jump, causing the tab to jump upward.

In the inventive head parking member, the limiting member is formed to include not only an area that is opposed to the parking area but also an extended area that is intersected by an extension of at least one of the slant surfaces of the parking area. For this reason, the limiting member can successfully restrict the unwanted movement of the unloading tab such as jumping or vibration. Therefore, the head placed in the unloaded state can be stabilized and prevented from being damaged by unwanted shock.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Configuration of Disk Drive

Figure 2:
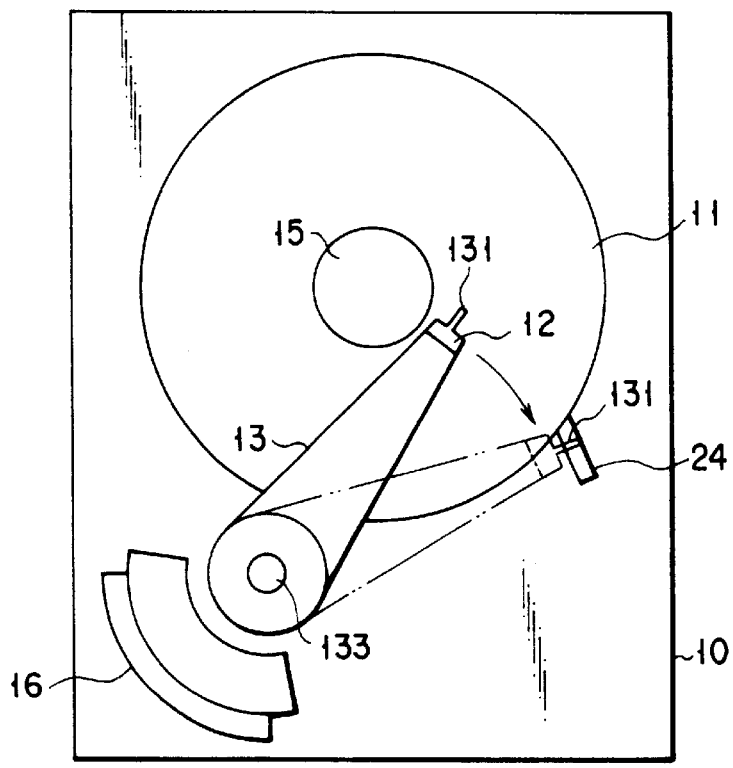
FIG. 2 is a diagram for use in explanation of the peripheral arrangement of the disk drive of FIG. 1.

The disk drive of this embodiment supposes an HDD having a head loading/unloading mechanism (or head parking member-based loading mechanism) as shown in FIG. 2. The disk drive has a disk 11 serving as a data recording medium, an actuator 13, and a head parking member 24 within a casing 10. The disk 11 is fixed to and driven by a spindle motor 15 to rotate at high speed.

The actuator 13 is driven by a voice coil motor (VCM) 16 to move in the direction of radius of the disk 11 with a rotation axis 133 as the center. The actuator has, at its end, an unloading tab (bar-like member) 131, which, as will be described later, is an ingredient that constitutes a mechanism for unloading (or retracting) a head 12 in conjunction with the head parking member 24. The head parking member 24 holds the tab 131, thereby maintaining the state where the head 12 is withdrawn from the disk 11.

Figure 1:
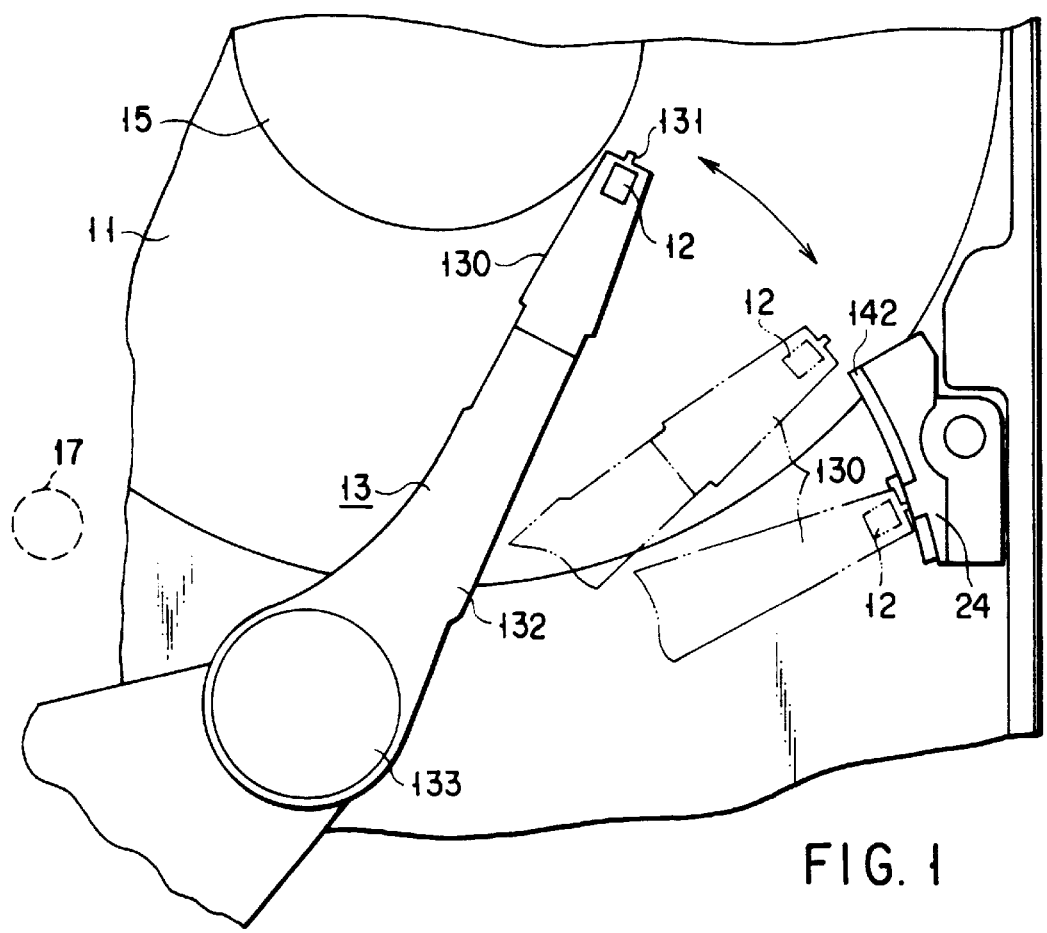
FIG. 1 is a diagram for use in explanation of an unload operation of a disk drive.

The actuator 13 has an arm 132 coupled with the rotation axis 133 and a suspension 130 connected with that arm as shown in FIG. 1. The arm 132 is driven by the VCM 16 to move in the direction of radius of the disk 11 with the rotation axis 133 as the center. The suspension 120 has the head 12 mounted on it and has at its end the unloading tab 131. The head supposes a flying head that comprises a slider on which a read head (MR head) and a write head are mounted and floats just over the disk surface for reading from and writing to the disk.

In an unload operation, the actuator 13 moves toward the circumference of the disk 11. When the head 12 moves to the outside of the disk 11 as the actuator 13 moves, the tab 131 slides on an unload surface 142 in the head parking member 24 and comes to rest in a predetermined place (parking area to be described later). The range of movement of the actuator 13 in the direction away from the disk is limited by a stopper 17 made of rubber and placed in suitable position as shown in FIG. 17. An explanation of a control system for the disk drive is omitted. The control system includes a central processing unit (CPU) that controls the unload operation of this embodiment.

Structure of the Head Parking Member

Figure 3A:
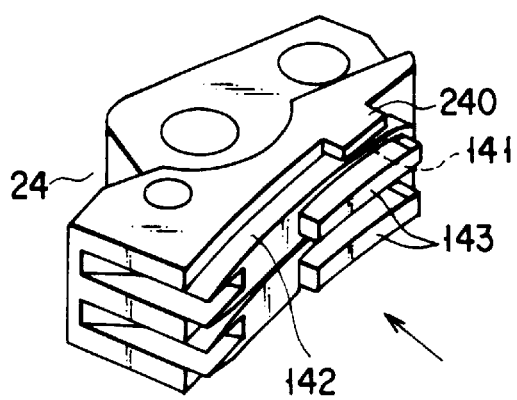
FIGS. 3A, 3B and 3C show the structure of a head parking member according to an embodiment of the present invention.
Figure 3B:
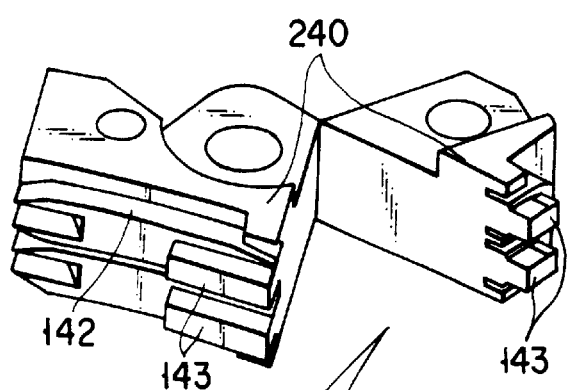
Figure 3C:
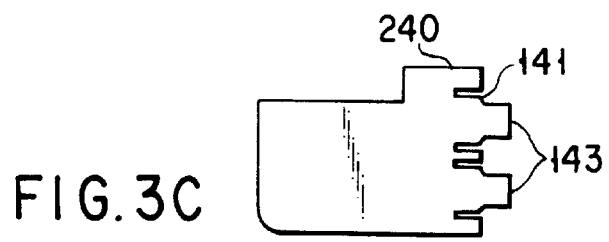
Figure 4:
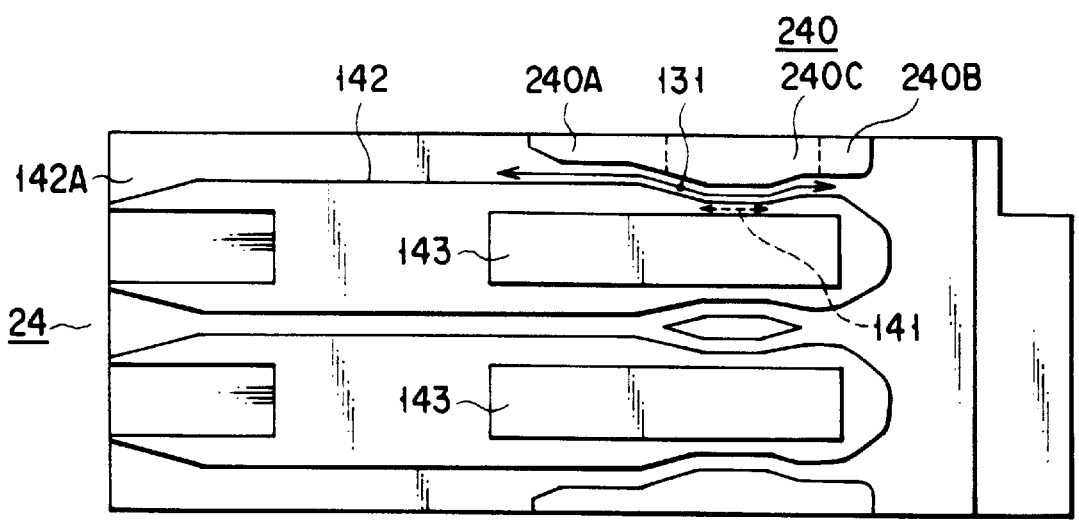
FIG. 4 is a diagram for use in explanation of an unload operation using the head parking member constructed as shown in FIGS. 3A, 3B and 3C.
Figure 5:
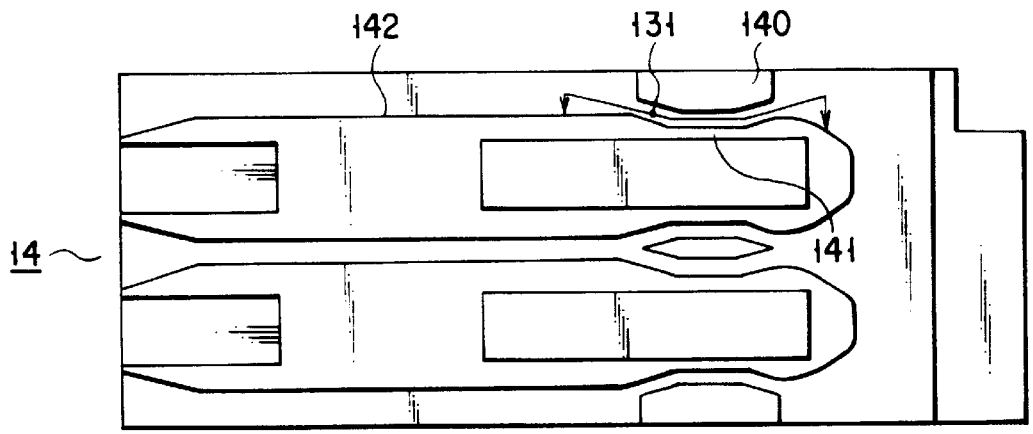
FIG. 5 is a diagram for use in explanation of an unload operation using a conventional head parking member.

The structure of the head parking member will be described with reference to FIGS. 3A, 3B, 3C, and 4. FIG. 3B is an exploded perspective view of the head parking member of FIG. 3A. FIG. 3C is a side view of the head parking member of FIG. 3B. FIG. 4 is a side view of the head parking member of FIG. 3A as viewed from the direction of an arrow.

The head parking member 24 is a head withdrawing member made of, say, ceramics. As described above, the head parking member 24 has the unload surface 143 for supporting the unloading tab 131 when the actuator 13 reached the outside of the disk 11. The unload surface 142 includes the parking area 141 where the tab 131 comes to rest. The head parking member 24 is provided in the proximity of the parking area 141 with a member 143 for supporting the end of the suspension 130 of the actuator 13. That is, the end of the suspension 130 is supported by the member 143 when the tab 131 is at rest in the parking area 141.

The parking area 141 is a recessed area that is formed to be opposed to a limiting member 240. The unloading surface 142 is continuous with the parking area 141 as shown in FIG. 4 and with a slant surface 142A on the disk side. The parking area 141 is provided at a predetermined distance from the circumference of the disk 11 so that the head 12 is fully withdrawn from the disk surface.

As the actuator 13 moves, the tab 131 moves on the unload surface 142 and the parking area 141 in the horizontal direction of FIG. 1. The limiting member 240 is formed to have a given spacing relative to both the unload surface 142 and the parking area 141 in the vertical direction. The limiting member, while being a single member, is divided into a portion 240C that covers the parking area 141 and portions 240A and 240B that cover portions of the unload surface 142 before and behind the parking area, respectively.

The limiting member 240 is adapted to restrict the movement of the unloading tab 131 sliding on the unload surface or the parking area 141 in the direction of its height perpendicular to the direction in which the tab slides.

Figure 10:
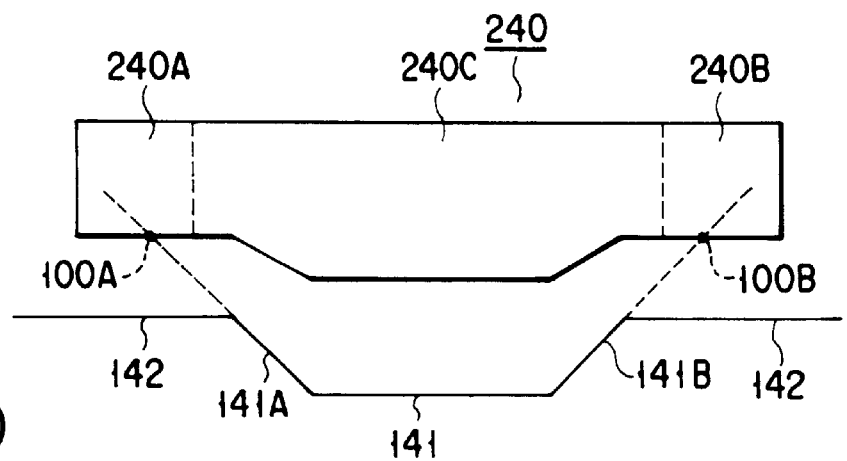
FIG. 10 is a diagram for use in explanation of the configuration of the parking area and the limiting member of the present invention.

Reference is further made to FIG. 10 to describe the structure of the parking area 141 and the limiting member 240.

The parking area 141 is a recessed portion that is continuous with the unload surface 142 and has a first slant surface 141A near to the disk 11 and a second slant surface 141B distant from the disk. The first portion 240C of the limiting member 240 is opposed to the parking area 141. The second portion 240A of the limiting member 240 is opposed to that portion of the unload surface 142 which is located near to the disk 11 and intersected by the extension of the first slant surface 141A at point 100A. The third portion 240B of the limiting member 240 is opposed to that portion of the unload surface 142 which is distant from the disk 11 and intersected by the extension of the second slant surface 141B at point 100B.

Thus, the limiting member 204 is formed to have not only the first portion 240C opposed to the parking area 141 but also the second and third portions 240A and 240B that covers the predetermined portions of the unload surface 142 before and behind the parking area.

Unload Operation

The unload operation of the disk drive having the head parking member 24 constructed as described above will be described below.

First, suppose that, as shown in FIGS. 1 and 2, the disk drive is in operation, the disk 11 is being rotated by the spindle motor 15, and the head 12 is being loaded toward the disk. In this state, when a command to stop the rotation of the spindle motor 15 is issued from the host system (personal computer) or the power to the drive is turned off, an unload operation is started. As described above, the CPU in the drive controls the unload operation.

In the unload operation, the VCM 16 forces the actuator 13 to move from above the disk 11 to the circumference of the disk. As shown in FIG. 1, the actuator arrives at the head parking member 24 placed outside the disk and the unloading tab 131 then slides on the unload surface 142 of the head parking member into the back thereof. When the actuator hits the stopper 17, the unload operation comes to an end. Thereby, the unloading tab comes to rest in the parking area 141 continuous with the unload surface 142. In this manner, the unload operation of the head 24 is completed.

The action when the actuator 13 collides with the rubber stopper 17 immediately before the termination of the unload operation, i.e., the deformation of the stopper, may cause the tab 131 to overshoot the parking area 141 as shown in FIG. 4. After that, the resiliency of the stopper may cause the tab to be pushed back in the direction of the disk. That is, before coming to rest in the parking area 141, the unloading tab 131 may move with instability on the unload surface 142 before and behind the parking area.

The parking area 141 has the slant surfaces 141A and 141B. When the tab 131 moves past the parking area, those slant surfaces act like a ski jump, causing the tab to jump upward. Specifically, as shown in FIG. 10, when the tab overshoots the parking area, the second slant surface 141B causes the tab to jump upward. On the other hand, when the tab is pushed back in the direction of the disk, the first slant surface 141A also causes the tab to jump upward.

When an external shock is applied to the disk drive at unload time, the tab is likewise caused to jump upward. In the present embodiment, the extended limiting member 240 (240A, 240B, 240C) is provided over the parking area 141 and given portions of the unload surface 142 on opposite sides of the parking area. In the event that the unloading tab 131 jumps up from the unload surface 142, therefore, such a movement of the tab is restricted by the limiting portions 240A and 240B. likewise, in the parking area 141, the up movement of the tab is restricted by the limiting portion 240C. Therefore, the unloading tab 131 will come to rest in a short time.

As described above, at unload time, the unloading tab 131 slides on the unload surface 142 with the movement of the actuator 13 and then comes to rest in the parking area 141. During this operation, an external shock to the disk drive or a collision between the actuator 13 and the stopper 17 may cause the unloading tab to jump up from the unload surface or the parking area.

In the present embodiment, the limiting member 240 (240A, 240B and 240C) is provided to cover the parking area 141 as the main area and the given portions of the unload surface 142 before and behind the parking area as extended areas. Therefore, when the tab moves past the parking area, the up movement of it can be restricted. Even if an external shock is applied to the disk drive after the unloading tab has come to rest in the parking area, the up movement of the tab can be restricted.

Therefore, because the vibration-like movement of the unloading tab 131 is suppressed, the head 12 mounted on the suspension 130 is also kept from vibration-like movement. Thereby, the heads withdrawn to the head parking member 14 can be prevented from being damaged by excessive vibration resulting from a collision between the actuator 13 and the stopper 17 or externally applied force to the disk drive.

Modification

Figure 6:
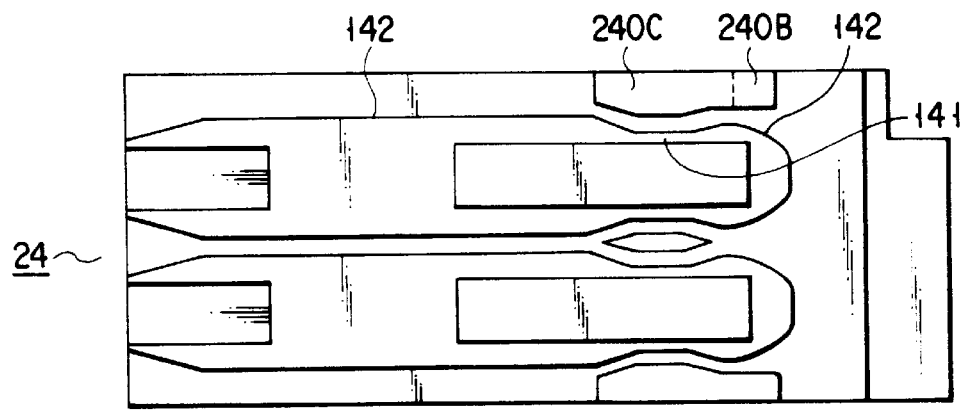
FIG. 6 shows a first modification of the head parking member of the present invention.
Figure 7:
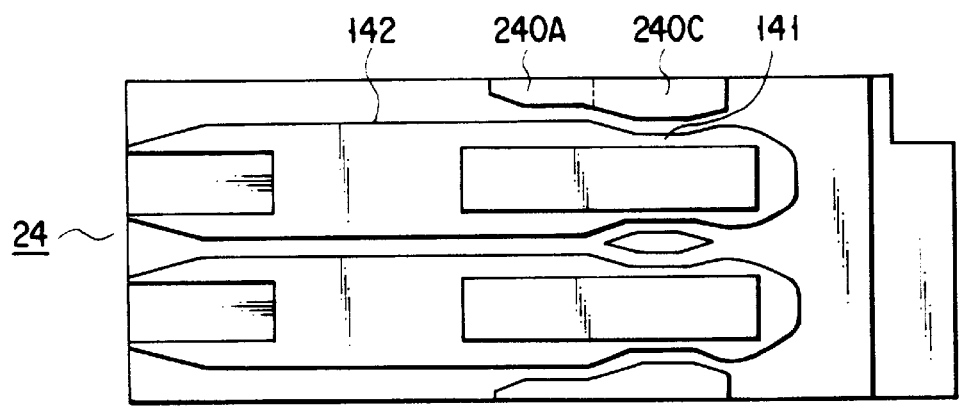
FIG. 7 shows a second modification of the head parking member of the present invention.
Figure 8A:
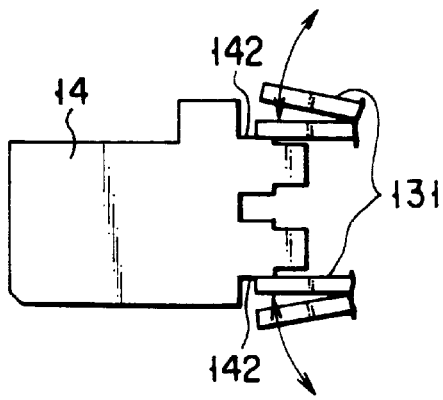
FIGS. 8A and 8B are diagrams for use in explanation of the structure of conventional head parking members.
Figure 8B:
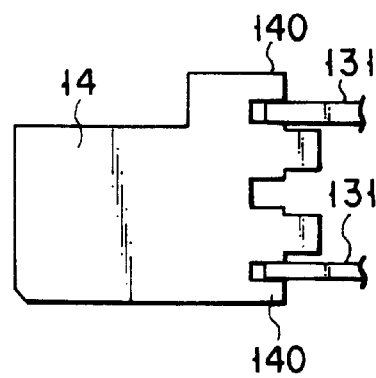
Figure 9:
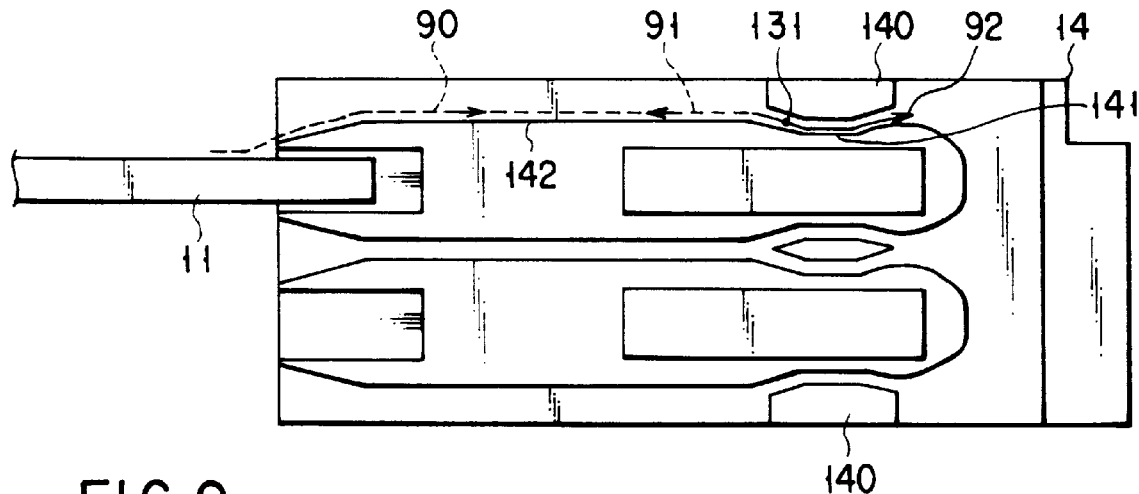
FIG. 9 is a diagram for use in explanation of an unload operation using the conventional head parking member.

FIG. 6 shows a first modification of the head parking member f the present invention, and FIG. 7 shows a second modification.

In the first modification, the head parking member 24 is constructed, as shown in FIG. 6, such that the limiting member 240 of the head parking member is composed of only the limiting portion 240C that ranges over the parking area 141 and the limiting portion 240B that ranges over the portion of the unload surface 142 behind the parking area.

In the second modification, the head parking member 24 is constructed, as shown in FIG. 7, such that the limiting member 240 of the head parking member is composed of only the limiting portion 240C that ranges over the parking area 141 and the limiting portion 240A that ranges over the portion of the unload surface 142 before the parking area.

In summary, in each of the modifications, one of the limiting portions 240A and 240B shown in FIG. 10 that is located over the portion of the unload surface before or behind the parking area is omitted. In this case, the up movement of the tab cannot naturally be suppressed in that area of the unload surface over which there is no limiting member.

However, each modification can be used effectively if an area of the unload surface where the up movement of the unloading tab is likely to occur can be identified from the structural characteristics of the actuator and head parking member. Specifically, if the unloading tab is relatively apt to overshoot, then the structure of the limiting member shown in FIG. 6 will be effectively used. Conversely, if the tab is relatively apt to be pushed back in the direction of the disk, then the structure of the limiting member shown in FIG. 7 will be effectively used.

According to the present invention, as described above, at unload time in a disk drive having a head loading/unloading mechanism, the vibration-like movement of the unloading tab can be suppressed in a predetermined tab-moving area including the parking area. Therefore, the head at rest can be stabilized and prevented from being damaged by unwanted shock.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:

a disk for storing data;

a head for reading and writing data from and to the disk;

an actuator holding the head having an unloading tab, for moving the head from a center of the disk to a circumference to the disk; and a head parking member provided outside the disk, for holding the unloading tab while the head is being unloaded, said head parking member having:

an unloading surface on which the unloading tap slides as the actuator moves;

having a recess with first and second inclined surfaces continuous with the unloading surface and serving as a position where the unloading tab is stopped; and a limiting member having a middle part covering the recess a first end part, which is intersected at a first point with a plane of the first inclined surface and a second end part, which is intersected at a second point with a plane of the second inclined surface, having a length equal to at least a distance between the first and second points, and covering a predetermined part of the parking area, thereby to restrict movement of the unloading tab in the vertical direction with respect to the unloading surface.

2. A disk drive comprising:

a disk on which data is recorded;

a head which reads data from said disk and writes data to said disk;

an actuator, having said head mounted on it, for moving said head over a range from the inside to the outside of said disk, said actuator having an unloading tab at its end; and a head parking member provided outside said disk for holding the unloading tab at unloading time, said head parking member having an unload surface on which the unloading tab slides as said actuator moves, a parking area having a recess with first slant surface and a second slant surface, continuous with the unload surface and providing a place where the unloading tab comes to rest, and a limiting member having a first limiting portion which covers the recess and a second limiting portion which covers a predetermined portion of the unload surface continuous with the first slant surface of the recess and said first slant surface being generally defined by a plane which when extended intersects said second limiting portion.

3. A disk drive according to claim 2, wherein the limiting member has a third limiting portion which covers a predetermined portion of the unload surface continuous with the second slat surface of the recess and is intersected by an extension of the second slant surface.

* * * * *